United States Patent [19]

Storey

[11] Patent Number: 5,012,602

[45] Date of Patent: May 7, 1991

[54] LOCKING LICENSE PLATE HOLDER

[76] Inventor: Gerald T. Storey, 6059 S. Dort Hwy., Grand Blanc, Mich. 48439

[21] Appl. No.: 436,695

[22] Filed: Nov. 15, 1989

[51] Int. Cl.⁵ ............................................... G09F 7/00
[52] U.S. Cl. ...................................... 40/201; 40/202; 40/209
[58] Field of Search ................. 40/200, 201, 202, 203, 40/209; 70/81, 82, 83, 79, 110, 111, 113, 114, 115; 248/488, 477, 496, 553

[56] References Cited

U.S. PATENT DOCUMENTS

| | | | |
|---|---|---|---|
| 1,962,664 | 6/1934 | McMillin | 40/209 |
| 1,975,796 | 10/1934 | Miller et al. | 40/202 |
| 2,156,806 | 5/1939 | Ducey . | |
| 2,388,349 | 11/1945 | Storm et al. . | |
| 2,564,986 | 8/1951 | Meyer | 40/202 |
| 2,710,475 | 6/1955 | Salzmann . | |
| 3,134,565 | 5/1964 | Trifiletti | 248/229 |
| 3,432,954 | 3/1969 | Ford | 40/202 |
| 3,685,188 | 8/1972 | Syversen | 40/201 |
| 4,495,787 | 1/1985 | Comstock | 248/553 |

FOREIGN PATENT DOCUMENTS 225093 11/1924 United Kingdom ................ 40/202

Primary Examiner—Kenneth J. Dorner
Assistant Examiner—J. Hakomaki
Attorney, Agent, or Firm—Jerry T. Kearns

[57] ABSTRACT

A locking license plate holder for mounting license plates on automobiles, trucks and trailers includes a frame having a channel formed therein dimensioned for insertion of a license plate. The frame includes a transparent cover plate provided with an elongated lock housing. Spaced pairs of aligned apertures are formed through the frame, the license plate, the cover plate and a side wall of the lock housing. A pair of retaining pins are dimensioned for insertion through a vehicle mounted license plate attaching bracket and through the pairs of aligned apertures in the license plate holder. A key actuated rotary locking cylinder is centrally mounted in the lock housing and includes a pair of transverse locking rods connected to the rotary cylinder for simultaneous extension and retraction. A pair of guide members in the housing constrains the locking rods to reciprocal linear movement. A transverse aperture is formed through each of the retaining pins for receiving the locking rods in a locked condition.

3 Claims, 3 Drawing Sheets

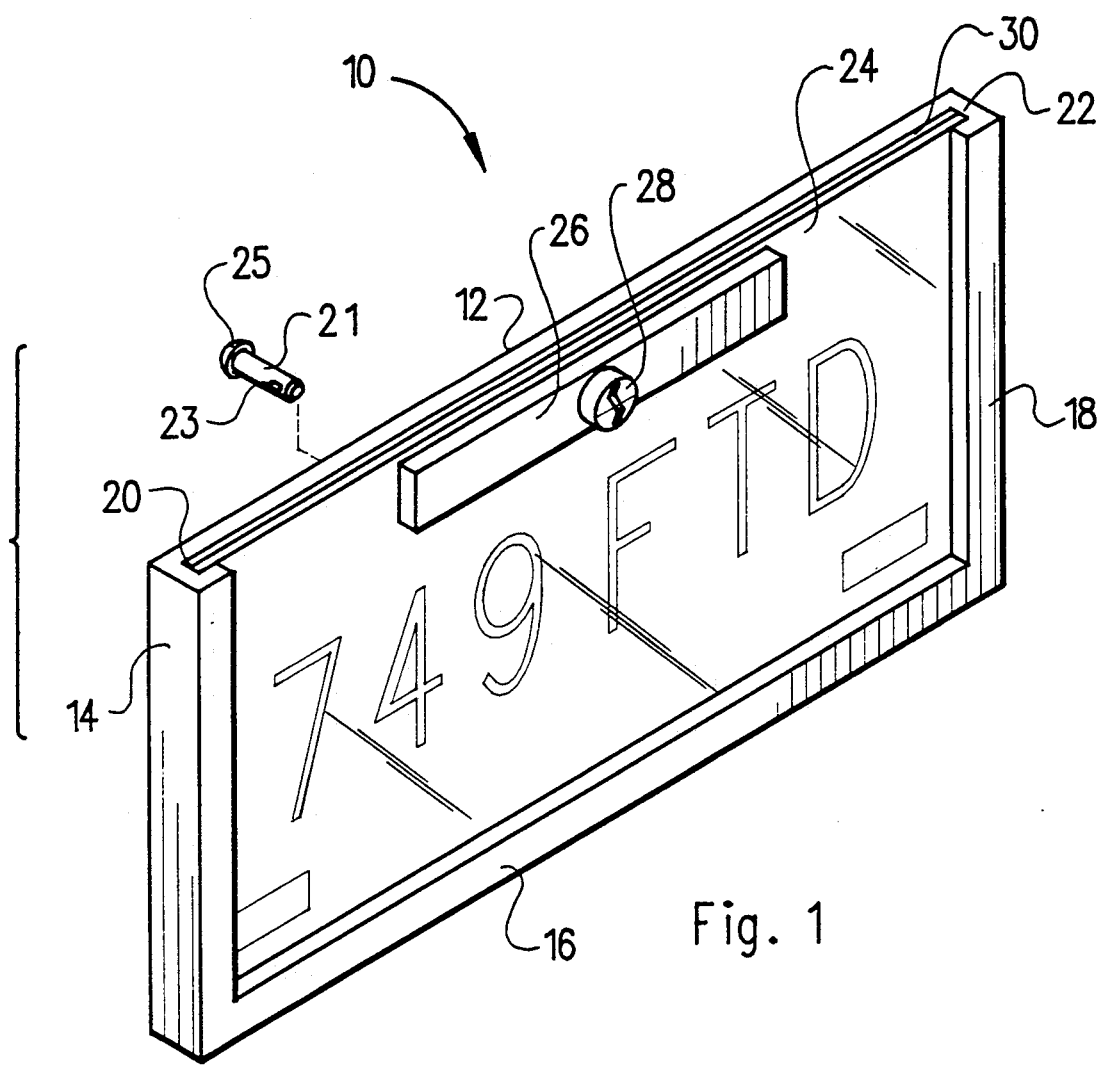
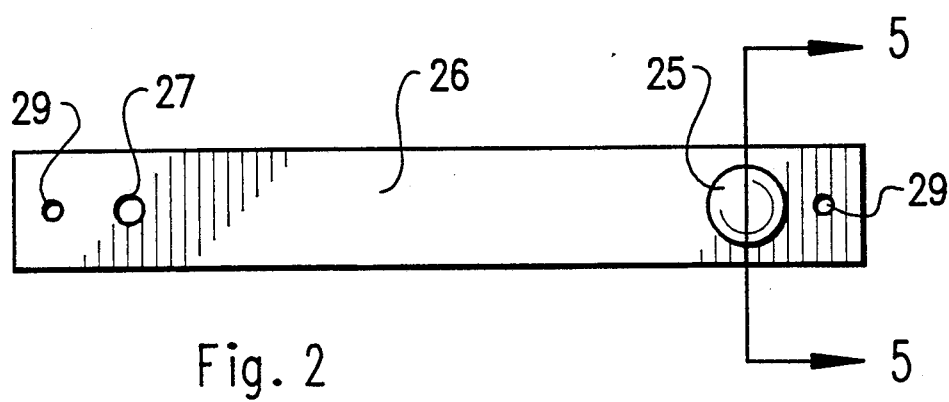
Fig. 1
Fig. 2

LOCKING LICENSE PLATE HOLDER

BACKGROUND OF THE INVENTION

1. Field of the Invention

The present invention relates to locking license plate holders, and more particularly pertains to a license plate holder which prevents unauthorized removal of a license plate and also removal of the holder from a vehicle.

2. Description of the Prior Art

Various types of locking license plate holders are known in the prior art. A typical example of such a locking license plate holder is to be found in U.S. Pat. No. 2,156,806, which issued to R. Ducey on May 2, 1939. This patent discloses a license plate holder formed by two hingedly connected cover plates which are securable together by a key actuated locking mechanism. U.S. Pat. No. 2,388,349, which issued to C. Storm et al on Nov. 6, 1945, discloses a license plate holder formed by a pair of slidably overlapped plates having telescoped hook flanges to engage the edges of the license plate. A rack and pin mechanism is provided for relatively sliding the overlapped plates. U.S. Pat. No. 2,564,986, which issued to J. Meyer on Aug. 21, 1951, discloses a locking license plate holder including an elongated rod provided with a laterally disposed T formation adjacent one end. The T formation has a head extending at right angles to the rod and a lock including a case is disposed in interlocked condition with the other end of the rod. U.S. Pat. No. 2,710,475, which issued to H. Salzmann on June 14, 1955, discloses a locking license plate holder having a transparent cover plate and including a key actuated locking mechanism. U.S. Pat. No. 3,432,954, which issued to J. Ford on Mar. 18, 1969, discloses a license plate holder having a transparent cover plate and a backing plate disposed within a frame for securing a license plate therein. An apertured flange on the backing plate is receivable through a slot on the frame for engagement with a conventional padlock.

While the above mentioned devices are directed to locking license plate holders, none of these devices disclose a locking license plate holder which utilizes a rotary locking cylinder in conjunction with a pair of linearly reciprocal locking rods selectively insertable through transverse apertures provided in a pair of spaced retaining pins. Inasmuch as the art is relatively crowded with respect to these various types of locking license plate holders, it can be appreciated that there is a continuing need for and interest in improvements to such locking license plate holders, and in this respect, the present invention addresses this need and interest.

SUMMARY OF THE INVENTION

In view of the foregoing disadvantages inherent in the known types of locking license plate holders now present in the prior art, the present invention provides an improved locking license plate holder. As such, the general purpose of the present invention, which will be described subsequently in greater detail, is to provide a new and improved locking license plate holder which has all the advantages of the prior art locking license plate holders and none of the disadvantages.

To attain this, representative embodiments of the concepts of the present invention are illustrated in the drawings and make use of a locking license plate holder for mounting license plates on automobiles, trucks and trailers which includes a frame having a channel formed therein dimensioned for insertion of a license plate. The frame includes a transparent cover plate provided with an elongated lock housing. Spaced pairs of aligned apertures are formed through the frame, the license plate, the cover plate and a side wall of the lock housing. A pair of retaining pins are dimensioned for insertion through a vehicle mounted license plate attaching bracket and through the pairs of aligned apertures in the license plate holder. A key actuated rotary locking cylinder is centrally mounted in the lock housing and includes a pair of transverse locking rods connected to the rotary cylinder for simultaneous extension and retraction. A pair of guide members in the housing constrains the locking rods to reciprocal linear movement. A transverse aperture is formed through each of the retaining pins for receiving the locking rods in a locked condition.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved locking license plate holder which has all the advantages of the prior art locking license plate holders and none of the disadvantages.

It is another object of the present invention to provide a new and improved locking license plate holder which may be easily and efficiently manufactured and marketed.

It is a further object of the present invention to provide a new and improved locking license plate holder which is of a durable and reliable construction.

An even further object of the present invention is to provide a new and improved locking license plate holder which is susceptible of a low cost of manufacture with regard to both materials and labor, and which accordingly is then susceptible of low prices of sale to the consuming public, thereby making such locking license plate holders economically available to the buying public.

Still yet another object of the present invention is to provide a new and improved locking license plate holder which provides in the apparatuses and methods of the prior art some of the advantages thereof, while simultaneously overcoming some of the disadvantages normally associated therewith.

Still another object of the present invention is to provide a new and improved locking license plate holder for preventing the unauthorized removal of a license plate and a license plate holder from a vehicle.

Yet another object of the present invention is to provide a new and improved locking license plate holder for securing license plates on automobiles, trucks and trailers.

Even still another object of the present invention is to provide a new and improved locking license plate holder which utilizes a rotary locking cylinder in conjunction with transversely reciprocal locking rods for selective insertion through transverse apertures provided in a pair of spaced retaining pins.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a locking license plate holder according to a first embodiment of the present invention.

FIG. 2 is a rear view illustrating the lock housing of the license plate holder of FIG. 1.

DESCRIPTION OF THE PREFERRED EMBODIMENT

Figure 3:
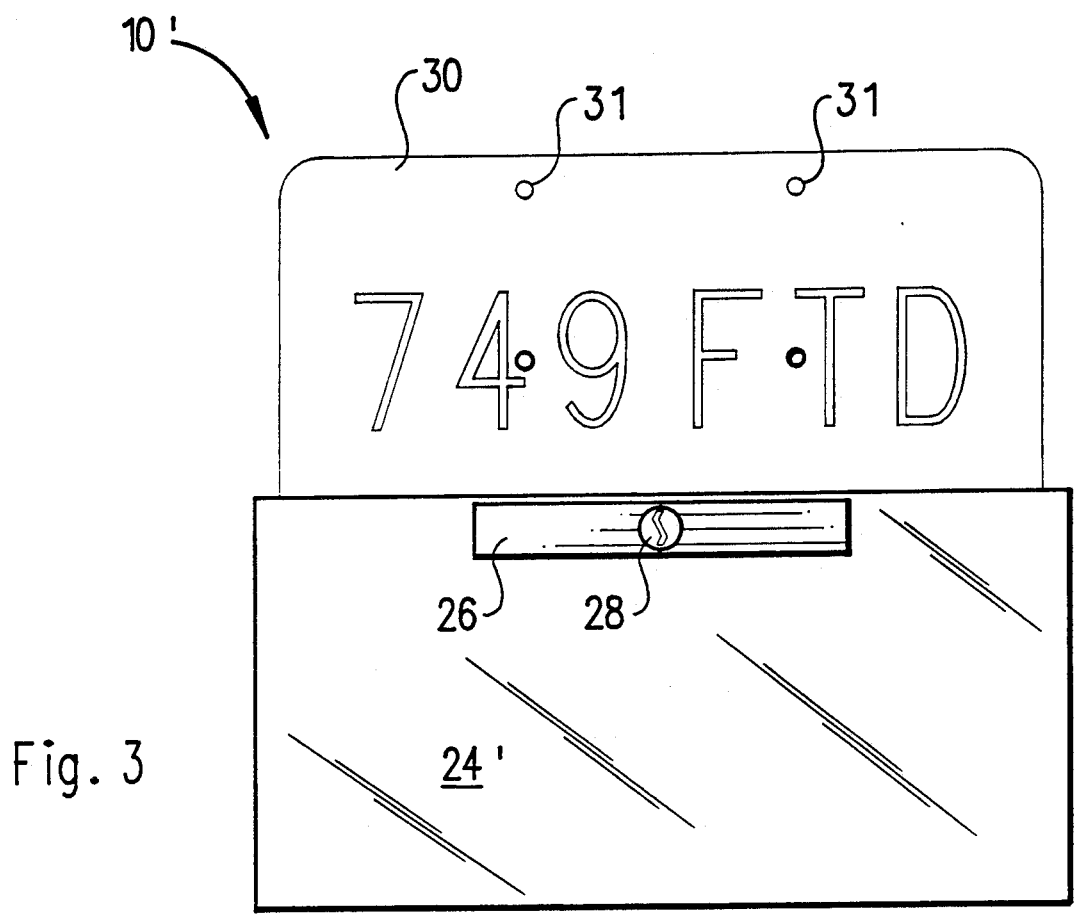
FIG. 3 illustrates a locking license plate holder according to a slightly modified embodiment of the present invention.

With reference now to the drawings, and in particular to FIG. 1 thereof, a new and improved locking license plate holder embodying the principles and concepts of the present invention and generally designated by the reference numeral 10 will be described.

More specifically, it will be noted that the first embodiment 10 of the invention includes a frame having a back wall 12, side rails 14 and 18, and a bottom rail 16. Slots 20 and 22 formed in the side rails 14 and 18 and a similar slot formed in the bottom rail 16 are dimensioned for insertion of a conventional license plate 30. Thus, a channel is formed within the frame for the sliding insertion of a conventional license plate. A transparent cover plate 24 is preferably formed from an impact resistant plastic material and has an elongated lock housing 26 secured thereon. At least one retaining pin 21 is insertable through aligned apertures formed through the back plate 12, the license plate 30, the cover plate 24 and a back wall of the lock housing 26. The retaining pin 21 includes an enlarged head 25 which bears against the exterior surface of the back plate 12, upon full insertion of the pin 21. A transverse aperture 23 is formed through an inner end of the pin 21 and is dimensioned for insertion of a transverse locking rod slidably disposed within the lock housing 26. The transverse locking rod is actuated by a conventional key actuated rotary locking cylinder 28. Preferably, a pair of spaced sets of aligned apertures are utilized in conjunction with a pair of spaced retaining pins 21. Although the invention has been described with the lock housing 26 secured to the front surface of the cover plate 24, it should be understood that the lock housing 26 may be provided on the exterior surface of the back plate 12 to allow insertion of the retaining pins 21 through the cover plate 24. To utilize the locking license plate holder 10 of FIG. 1, the retaining pin 21 is also inserted through an aperture tab of a conventional vehicle mounted license plate bracket.

FIG. 2 illustrates the back side of the lock housing 26 and illustrates apertures 27 and 29 formed through the back wall of the housing 26. The retaining pin head 25 obscures one of the apertures 27. The apertures 29 may be utilized to secure the lock cylinder housing 26 to the cover plate 24 or the backing plate 12 illustrated in FIG. 1, by suitable threaded fasteners.

FIG. 3 illustrates a slightly modified second embodiment 10' of the present invention in which the cover plate 24' is formed integrally with the frame of the holder. In this connection, the entire frame may be formed from an integrally molded or thermally bonded transparent plastic material and provided with a hollow interior communicating with a slot formed through a top wall of the holder for insertion of a conventional license plate 30. As shown, conventional apertures 31 are formed through the license plate 30 and are utilized to receive the retaining pins 21, as shown in FIG. 1.

Figure 4:
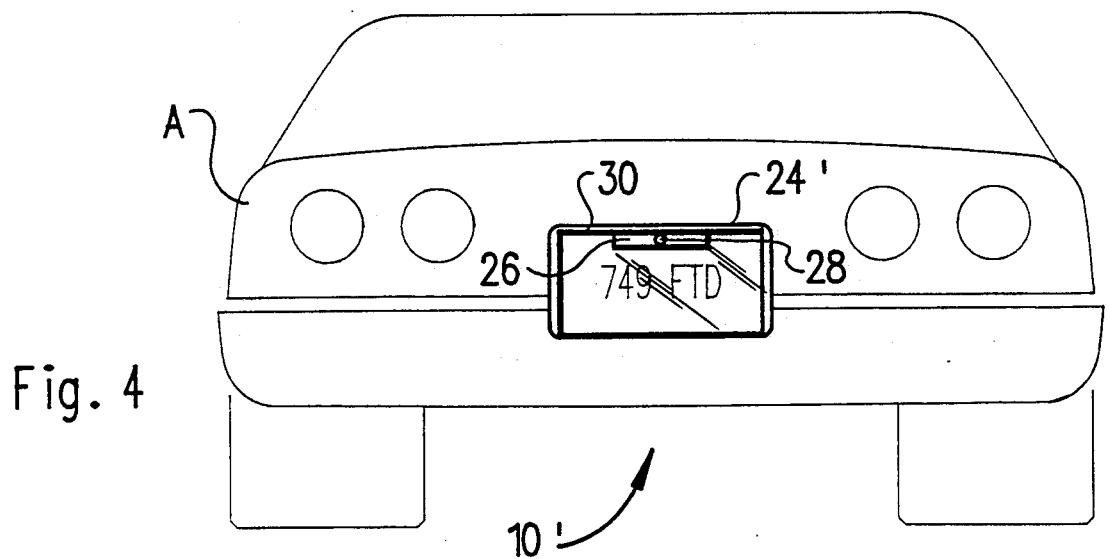
FIG. 4 illustrates the locking license plate holder of FIG. 3 installed on a conventional automobile.

FIG. 4 illustrates the license plate holder 10' mounted on a conventional automobile A. The license plate 30 and holder 24' cannot be removed from the automobile A, without utilizing a key for the locking cylinder 28.

Figure 5:
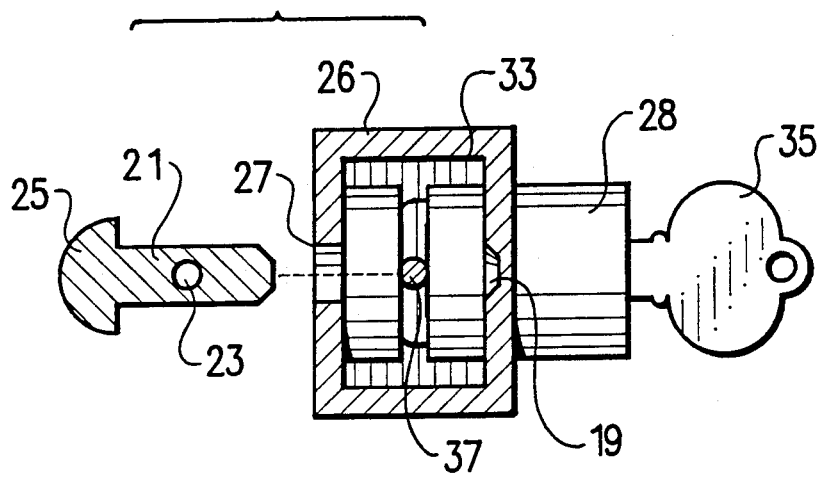
FIG. 5 is a transverse cross sectional view, taken along line 5—5 of FIG. 2, and illustrating the constructional details of the locking mechanism.

FIG. 5 is a transverse cross sectional view, taken along line 5—5 of FIG. 2. The retaining pin 21 is receivable through a circular aperture 27 formed in a back wall of the hollow rectangular elongated lock housing 26. A frusto conical seat 19 is formed in an interior side of the front wall of the housing 26 and is dimensioned for engagement with a complementary formed inner end of the retaining pin 21. The transverse aperture 23 formed through the retaining pin 21 is dimensioned for the selective insertion of a transversely reciprocal locking rod 37 operably connected for actuation by a conventional key actuated locking cylinder 28. A conventional key 35 is utilized to rotate the locking cylinder mechanism 28.

Figure 6:
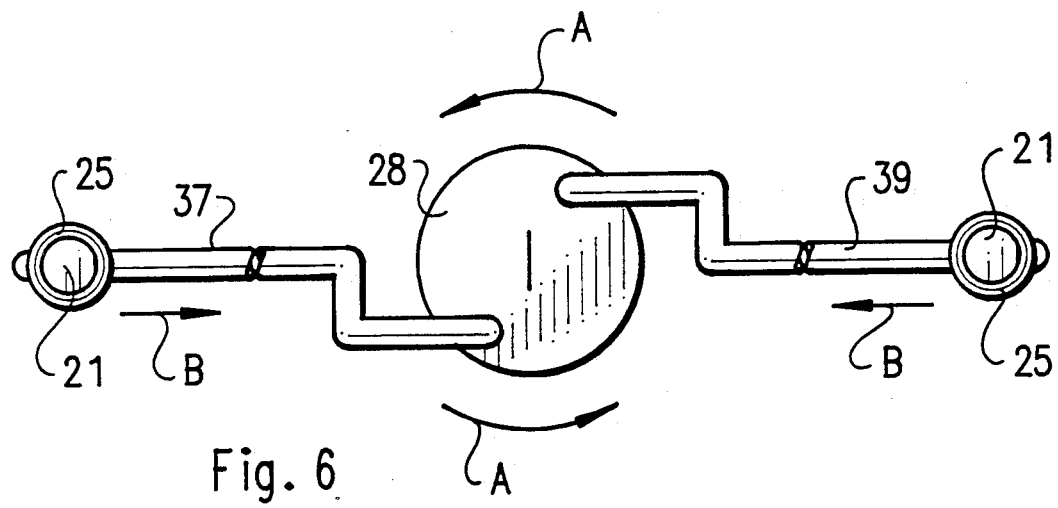
FIG. 6 is a detail view illustrating the manner of operation of the locking mechanism of the license plate holder of the present invention.

As shown in FIG. 6, a pair of transverse locking rods 37 and 39 are preferably connected to the rotary locking cylinder 28, as shown. A pair of spaced retaining pins 21 are utilized in this arrangement. Upon rotation of the locking cylinder 28 as indicated by arrows A, the locking rods 37 and 39 will be linearly retracted as indicated by arrows B, to be released from engagement through the transverse apertures formed in the retaining pins 21. This allows the retaining pins 21 to be withdrawn to allow for removal of the license plate and license plate holder.

Figure 7:
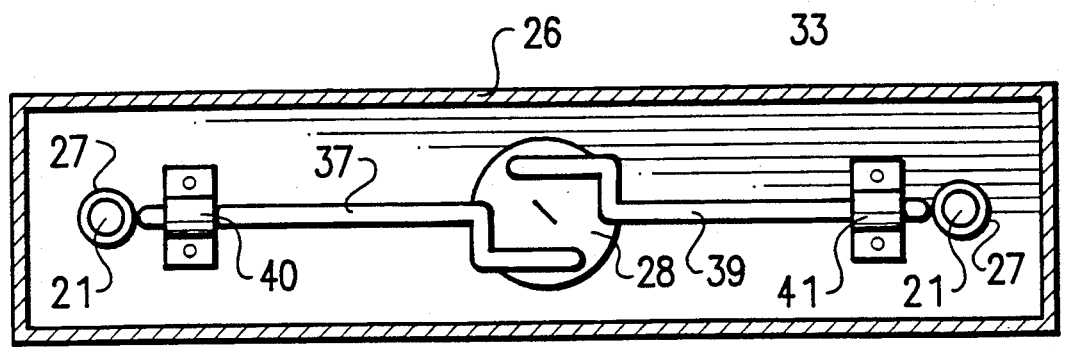
FIG. 7 is a longitudinal cross sectional view, illustrating the locking mechanism within the lock housing of the license plate holder according to the present invention.

FIG. 7 illustrates a longitudinal cross sectional view of the lock housing 26. The transverse reciprocal locking rods 37 and 39 are supported by a pair of guide members 40 and 41 which constrains the free end portions of each of the locking rods 37 and 39 to linear movement. The retaining pins 21 are inserted through the spaced apertures 27 provided in the housing 26.

As may now be understood, the present invention provides a locking license plate holder for the secure and expedient connection of both a license plate holder and license plate to a motor vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the Untied States is as follows:

1. A locking license plate holder, comprising:
    a frame;
    a channel formed in said frame and dimensioned for insertion of a license plate;
    a transparent cover plate on said frame;
    an elongated hollow lock housing secured on said cover plate;
    a spaced pair of aligned apertures formed through said frame, said license plate, said cover plate and a side wall of said lock housing;
    a pair of retaining pins dimensioned for insertion through said pairs of aligned apertures;
    a key actuated rotary locking cylinder centrally disposed in said lock housing;
    a transverse aperture formed through each of said retaining pins;
    a pair of transverse locking rods in said housing connected to said rotary locking cylinder for simultaneous extension and retraction through said transverse apertures in said retaining pins;
    a pair of guide members in said housing constraining said locking rods to reciprocal linear movement; and
    a pair of seats formed in said lock housing for engagement with inner ends of said retaining pins.

2. The locking license plate holder of claim 1, wherein said cover plate is integral with said frame.

3. The locking license plate holder of claim 2, wherein said channel is formed by a slot in a top wall of said frame.

* * * * *